US005469156A

United States Patent [19]

Kogure

[11] Patent Number: 5,469,156
[45] Date of Patent: Nov. 21, 1995

[54] FIELD SENSOR COMMUNICATION SYSTEM

[75] Inventor: Makoto Kogure, Katsuta, Japan

[73] Assignee: Hitachi, Ltd., Tokyo, Japan

[21] Appl. No.: 877,137

[22] Filed: May 1, 1992

Related U.S. Application Data

[63] Continuation of Ser. No. 547,215, Jul. 3, 1990, abandoned.

[30] Foreign Application Priority Data

Jul. 4, 1989 [JP] Japan .................................... 1-172749

[51] Int. Cl.[6] ........................................ H04B 3/54

[52] U.S. Cl. ............................... 340/870.38; 340/870.18; 340/870.39

[58] Field of Search ......................... 340/870.39, 870.40, 340/870.38, 870.18; 375/5; 455/69; 371/20.1, 20.4, 20.5, 24, 71

[56] References Cited

U.S. PATENT DOCUMENTS

| | | | |
|---|---|---|---|
| 4,520,488 | 5/1985 | Houvig et al. | 340/870.39 X |
| 4,607,247 | 8/1986 | Sterling, Jr. et al. | 340/870.39 X |
| 4,737,787 | 4/1988 | Ito et al. | 340/870.18 |
| 4,806,905 | 2/1989 | McGowan, III et al. | 340/870.39 X |
| 5,014,050 | 5/1991 | Lewiner et al. | 340/825.54 |

FOREIGN PATENT DOCUMENTS

| | | | |
|---|---|---|---|
| 58-48198 | 3/1983 | Japan . | |
| 59-201535 | 11/1984 | Japan . | |
| 60-196039 | 10/1985 | Japan | 371/71 |

*Primary Examiner*—Michael Horabik
*Attorney, Agent, or Firm*—Antonelli, Terry, Stout & Kraus

[57] ABSTRACT

A field sensor communication system is arranged in such a manner that, when an electric current, the level of which can be changed to a predetermined level, is, transmitted to a signal transmission line having at least one load resistor connected in series and the voltage change across the load resistor due to the change in the electric current is detected as a reception signal, the predetermined level is cyclically changed to a plurality of levels so that the level at which a good signal reception condition can be realized is determined to perform a communication at the thus determined level. As a result, even if the value of the load resistor in the signal transmission line is changed, the communication can be performed normally, since an undesirable change of the level of the reception signal can be prevented.

11 Claims, 4 Drawing Sheets

FIELD SENSOR COMMUNICATION SYSTEM

This application is a Continuation of application Ser. No. 547,215, filed Jul. 3, 1990, now abandoned.

BACKGROUND OF THE INVENTION

1. Field of the Invention

The present invention relates to a field sensor communication system, and, more particularly, to a field sensor communication system in which physical quantities relating to the process being carried out at each of a plurality of plants are detected and signals denoting the thus detected physical quantities are transmitted to an upper level unit.

2. Description of the Prior Art

In general, a sensor called "a field sensor" is capable of detecting physical quantities, such as pressures, temperatures and flow rates, of each of a number of plants and of converting the thus detected values into electric signals so as to transmit them to an upper level unit via a transmission line.

The above-described transmission of the electric signals are performed in a standardize manner in such a way that the field sensor transmits an analog current signal in a range of 4 to 20 mA to the transmission line and the upper level unit receives the thus transmitted analog current signal. In general, the analog signal is transmitted from the field sensor to the upper level unit in a one-way communication manner.

In recent years, field sensors including a microprocessor have been developed and put into practical use owing to the improvement in semiconductor integrated circuit technology. According to a field sensor of the above-described type, a two-way digital signal communication can be performed through the transmission line in addition to the above-described one-way analog signal communication, so that range setting, self-diagnosis and the like operations of the field sensor can be performed in a remote control manner. A device of the above-described type has been disclosed in Japanese Patent Laid-Open No. 58-48198, and another device has been disclosed in Japanese Patent Laid-Open No. 59-201535.

A specific description will be made with reference to FIG. 4 which illustrates an example of the structure of a field sensor system which must be provided with an external power source. A field sensor 1 is operated by electricity supplied from an external power source 4 so that the field sensor 1 serves as a constant current source which transmits an analog current signal which corresponds to a detected physical quantity. An upper level receiving instrument 3 receives the analog current signal (to be called "the analog signal" hereinafter), which passes through a resistor, in series, inserted into the transmission line, by detecting the potential difference across the resistor so as to use it as the indicated value of the field sensor 1. An upper level communication device 2 is connected to the transmission line at an optional position between the field sensor 1 and the upper receiving instrument 3 or the external power source 4 so that a two-way digital signal communication with the field sensor 1 is performed.

The signal transmission to the transmission line can be performed by a method in which digital signals are used for the communication by superimposing the digital signals on the analog signals so that the values of the analog signals are not influenced; a method in which the signal transmission is performed by switching the analog signals and the digital signals; and a method in which the signal communication is performed by using only the digital signals.

However, according to the above-described conventional technologies, the transmission signal is transmitted in the form of an electric current and the reception signal is received in the form of a voltage. Therefore, the level of the reception signal is enlarged in proportion to the value of the load resistor which is, connected in series in the transmission line. As a result, the usable range of the load resistor must be narrowed in order to perform an accurate communication.

Therefore, since the usable range of the load resistor is limited, it has been difficult to expand the system by, for example, adding a novel upper level receiving instrument to the transmission line.

SUMMARY OF THE INVENTION

Accordingly, an object of the present invention is to provide a field sensor communication system which can be easily expanded and which is capable of performing a reliable communication.

In order to achieve the above-described object, according to the present invention, there is provided a field sensor communication system in which a signal is transmitted/received between at least a field sensor and at least an upper unit via a signal transmission line, either of the field sensor or the upper unit of the field sensor communication system having: means for determining whether or not a transmission signal is received correctly; and means for changing the level of the transmission signal in accordance with the output of the determining means.

According to the present invention, there is provided a field sensor communication system in which an analog signal is transmitted/received between at least a field sensor and at least an upper unit via a signal transmission line, either of the field sensor or the upper unit of the field sensor communication system having: means for determining whether or not a transmission signal, which has been superimposed on the analog signal, is received correctly; and means for changing the level of the transmission signal, which has been superimposed on the analog signal, in accordance with the output of the determining means.

According to the present invention, there is provided a field sensor connected to a signal transmission liner having: means for superimposing a transmission signal on a sensor signal; means for transmitting an output signal, which has been superimposed, to the signal transmission line as a superimposed signal; means for detecting the superimposed signal from the signal transmission line so as to determine whether or-not the transmission signal is received correctly; and means for changing the level of the transmission signal to be superimposed on the sensor signal in accordance with the output of the determining means.

According to the present invention, there is provided an upper receiving instrument connected to a signal transmission line, having: means for transmitting a transmission signal to the signal transmission line; means for detecting the transmission signal from the signal transmission line so as to determine whether or not the transmission signal is received correctly; and means for changing the level of the transmission signal in accordance with the output of the determining means.

According to the present invention, there is provided an upper communication device connected to a signal transmission line, having: means for transmitting a transmission signal to the signal transmission line; means for detecting the transmission signal from the signal transmission line so as to determine whether or not the transmission signal is received correctly; and means for changing the level of the transmission signal in accordance with the output of the determining means.

According to the present invention, there is provided a field sensor communication system in which a signal is transmitted/received between at least a field sensor and at least an upper unit via a signal transmission liner and in which an upper communication device is connected to the signal transmission line at a position between the field sensor and the upper unit, the field sensor having: means for superimposing a transmission signal on a sensor signal; means for transmitting a signal, which has been superimposed, to the signal transmission line; means for detecting the superimposed signal from the signal transmission line so as to determine whether or not the transmission signal is received correctly; and means for changing the level of the transmission signal in accordance with the output of the determining means. Each of the upper unit and the upper communication device includes: means for transmitting a transmission signal to the signal transmission liner means for detecting the transmission signal from the signal transmission line so as to determine whether or not the transmission signal is received correctly; and means for changing the level of the transmission signal in accordance with the output of the determining means.

According to the present invention, there is provided a field sensor communication system in which an analog signal is transmitted/received between at least a field sensor and at least an upper unit via a signal transmission line, either of the field sensor or the upper unit of the field sensor communication system having: means for superimposing a predetermined level transmission signal on the analog signal; means for determining whether or not the transmission signal, which has been superimposed on the analog signal, is received correctly from the signal transmission liner and means for changing the receipt level of the superimposed transmission signal in accordance with the output of the determining means.

According to the present invention, there is provided an upper level communication device connected to a signal transmission line, having: means for transmitting a transmission signal to the signal transmission line; and means for changing the level of the transmission signal in accordance with the transmitting means.

According to the present invention, there is provided a filed sensor communication system in which an analog signal is transmitted/received between at least a field sensor and at least an upper unit via a signal transmission line, at least the field sensor having: means for superimposing a transmission signal on the analog signal; means for detecting the transmission signal, which has been superimposed on the analog signal, from the signal transmission line; and means for making a comparison between the level of the detected transmission signal and a predetermined value so as to change the transmission level of the transmission signal to a level with which the transmission signal can be received correctly.

According to the present invention, there is provided a field sensor communication system in which a digital signal is transmitted/received between at least a field sensor and at least an upper unit via a signal transmission line, at least either of the field sensor or the upper unit of the field sensor communication system having: means for determining whether or not the digital signal is received correctly; and means for changing the transmission level of the digital signal in accordance with the out put of determining means.

According to the above-described field sensor communication system comprising the thus structured field sensor and the upper units, the system can be operated with the transmission signal level or the amplification/attenuation level of the receipt signal changed. The usable range of each of the devices can be widened.

Furthermore, the most suitable signal level can be cyclically selected by means of the self-diagnosis of the device or in accordance with an external instruction. Therefore, even if the communication temporarily becomes impossible due to, for example, an addition of an upper receiving instrument which cause the increase of the total load resistance, the most suitable transmission signal level can be automatically selected by the device. Therefore, the communication is enabled to be again performed. As a result, problems which arise at the time of the system change can be prevented.

Other and further objects, features and advantages of the invention will be appear more fully from the following description.

DESCRIPTION OF THE PREFERRED EMBODIMENTS

An embodiment of the present invention will now be described with reference to the drawings.

Figure 1:
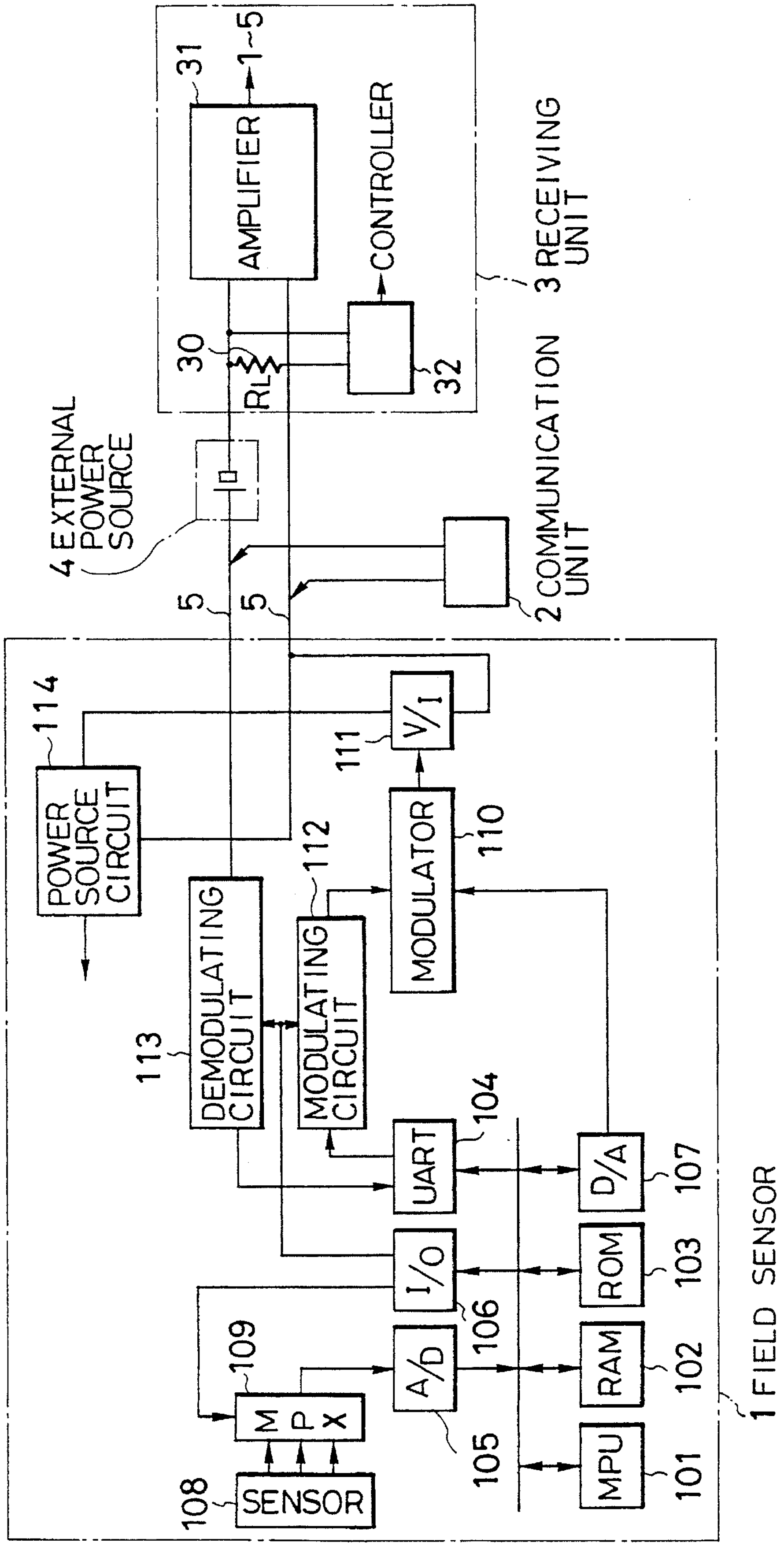
FIG. 1 is a structural view which illustrates an embodiment of a field sensor communication system according to the present invention.

FIG. 1 is a block diagram which illustrates a case in which communication between a field sensor 1 and an upper level receiving unit 3 is made by a digital signal superimposed on an analog current signal in a range of 4 to 20 mA which is output from the field sensor 1.

Referring to the drawing, the field sensor 1 comprises a combination sensor 108 which detects physical quantities, such as pressure, temperature, flow rate and the like relating to a process carried out by a plant, the combination sensor 108 being operated by electricity supplied from an external power source 4 via a power source circuit 114. The output from the above-described sensor 108 is processed according to a predetermined method in the field sensor 1, a signal obtained on the basis of this process being transmitted to the upper level receiving unit 3 via a transmission line 5. The upper level receiving unit 3 comprises a resistor 30 connected to the transmission line 5 so that the upper level receiving unit 3 receives a signal denoting the above-described physical properties transmitted from the field sensor 1 by detecting the voltage across the resistor 30. The upper level receiving unit 3 further includes a communicating device 32 which operates to perform a communication with the field sensor 1 by means of the above-described digital signal. As a result, processing, such self-diagnosis and a change in the output range value, are performed. An upper level communication device 2 is connected to the transmission line 5 between the field sensor 1 and the external power source 4. The upper level communication device 2 thus positioned communicates with the field sensor 1 by means of the above-described digital signal so that processings, such as monitoring, calibration or the like, of the I/O signal of the field sensor 1 are performed.

Now, the structure of the field sensor 1 will be described.

Each of the outputs from the combination sensor 108 is arranged to be supplied to a multiplexer 109. The multiplexer 109 receives an input switch signal supplied from an I/O interface 106, the output of the multiplexer 109 being supplied to an A/D converter 105. The field sensor 1 further comprises a microprocessor 101 which performs compensations and calculations by using the output successively transmitted from the A/D converter 105 and a variety of coefficients stored in a ROM 103 and a RAM 102. As a result, the microprocessor 101 obtains a true value so as to transmit an output value, which has been standardized in accordance with an output range previously set by the RAM 102, to the D/A converter 107. The output from the D/A converter 107 is transmitted to a V/I converter 111 via a modulator 110, the output from the V/I converter 111 being then transmitted to the above-described transmission line 5. The V/I converter 111 is controlled in such a manner that an electric current, the level (4 to 20 mA) of which corresponds to the input signal, is transmitted to the transmission line 5.

A communication digital signal is added to the above-described modulator 110 which therefore transmits a signal formed by superimposing the digital signal on the analog signal, the signal thus formed being transmitted to the transmission line 5 via the V/I converter 111. The above-described digital signal is supplied to the modulator 110 from a modulation circuit 112. The modulation circuit 112 modulates the output from a transmitting/receiving circuit 104 and applies it to the modulator 110. As the signal transmitted from the modulation circuit 112, any signal selected from the following signals is employed: two kinds of frequency signals corresponding to "1" and "0" of a digital signal as in frequency modulation; a signal which corresponds to "1" and "0" with the magnitude thereof as in amplitude modulation; a signal the two phases of which correspond to "1" and "0" as in phase modulation; and the like. The thus employed signal is used as, for example, a signal which responds to the communication with the upper level receiving unit 3.

If the output signal from the modulation circuit 112 is a square wave or sine wave small signal having the same amplitude in both the positive and the negative directions, the value pointed out by the above-described receiving unit 3 which detects the analog signal is not affected even if the communication is made by transmitting and superimposing the digital signal on the analog signal. In this case, only the output current value from the above-described V/I converter 111 is instantaneously changed.

The level of the output signal transmitted from the modulation circuit 112 is arranged to correspond to the signal level selected in response to a transmission level switch signal transmitted from the I/O interface 106.

The transmission line 5 receives a transmission signal from the upper level receiving unit 3 or from the upper level communication device 2, the transmission signal thus received being a digital signal similar to the current signal which has been modulated as described above.

Since the voltage level of the external power source 4 which supplies the electricity to the transmission line 5 is arranged to be constant, the voltage level across the resistor 30 which is the analog signal detector of the upper level receiving unit 3 is changed when the value of the current passing through the transmission line 5 has been changed. Therefore, the voltage (the line voltage of the transmission line 5) applied to the field sensor 1 encounters a voltage change the polarity of which is reversed to that in the above-described voltage change.

A demodulation circuit 113 disposed in the field sensor 1 detects the above-described line voltage change so as to demodulate it. As a result, a digital signal consisting of "1" and "0" is formed, the digital signal thus formed being then received by the transmission/receiving circuit 104. In this case, also the digital signal transmitted from the modulation circuit 112 in the field sensor 1 changes the current passing through the transmission line 5. Therefore, the line voltage of the transmission line 5 is changed so that the field sensor 1 becomes capable of receiving, via the demodulation circuit 113, a signal which has been transmitted therefrom.

The demodulation circuit 113 comprises an amplifier or an attenuator so as to modulate the quantity of voltage variation which takes place in the above-described line voltage by amplifying or attenuating it at a proper amplification or attenuation degree in response to the receiving level switch signal transmitted from the above-described I/O interface 106.

The transmission signal transmitted from the transmitting/receiving circuit 104 of the thus structured field sensor 1 to the modulation circuit 112 is recorded in the RAM 102 at a predetermined time interval in accordance with a command issued from the MPU 101. The transmission signal then passes through the modulation circuit 112, the modulator 110 and the V/I converter 111 before it reaches the transmission line 5. The transmission signal passes through the transmission line 5, the demodulation circuit 113 and the transmitting/receiving circuit 104 before it is recorded in the above-described RAM 102 as a reception signal. The MPU 101 makes a comparison between the above-described two signals so as to determine the coincidence degree. The MPU 101 then instructs the I/O interface 106 to change the transmission signal level at a time of the modulation operation performed by the modulation circuit 112. The above-described procedure is arranged to be repeated. As the transmission signal level, a plurality of levels have been previously set in the modulation circuit 112. Therefore, the I/O interface 106 successively switches the plurality of transmission signal levels, which have been previously set in the modulation circuit 112 as described above, the switching being performed in accordance with an instruction issued by the MPU 101. That is, after the above-described switching of the successive transmission signal levels has been completed, the coincidence degree between the transmission signal and the reception signal at each of the plurality of the transmission signal levels is detected. The MPU 101 determines the transmission signal level displaying the best coincidence degree and instructs the I/O interface 106 to maintain the transmission signal level which has been determined that it displays the best coincidence. The I/O interface 106 transmits the transmission level switch signal to the modulation circuit 112 until the above-described predetermined time has passed and an instruction to switch the next transmission signal level is transmitted from the MPU 101, the transmission level switch signal being transmitted for the purpose of maintaining the instructed transmission signal level. As a result, the modulation circuit 112 maintains the transmission signal level at the level at which the best reception status can be realized and modulates the transmission signal so as to transmit it to the modulator 110.

Now, the structure of the upper level receiving unit 3 will be described.

Figure 3A:
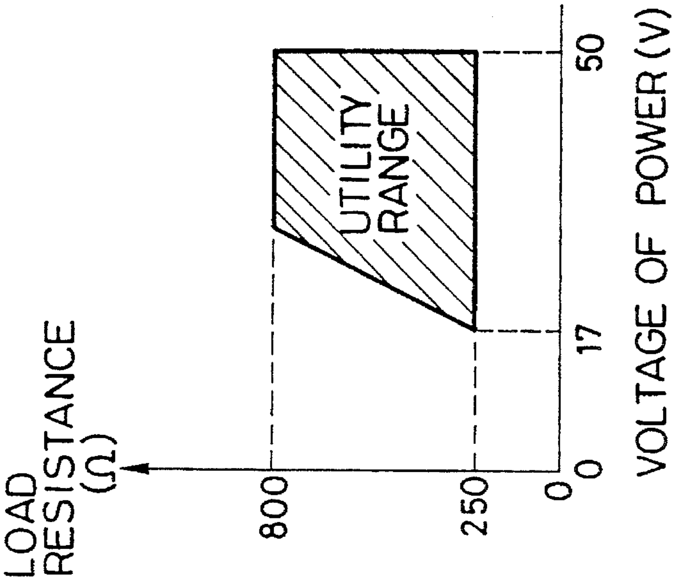
FIGS. 3A, 3B and 3C illustrate the effect of the present invention.
Figure 3B:
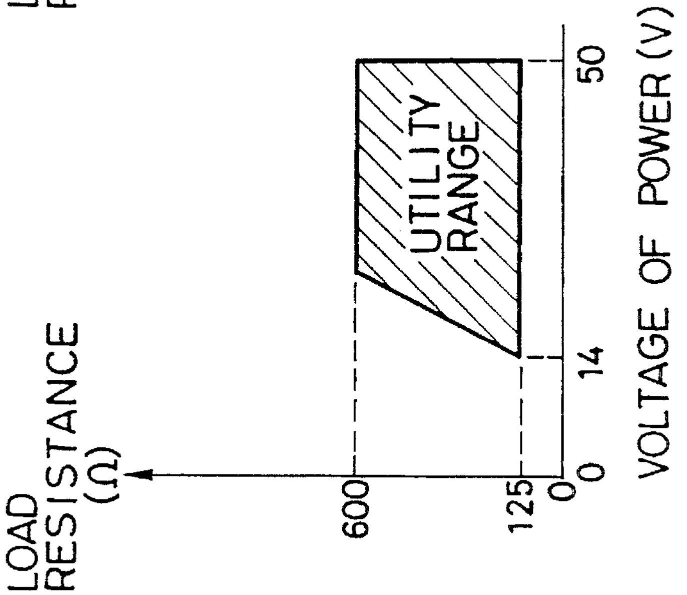
Figure 3C:
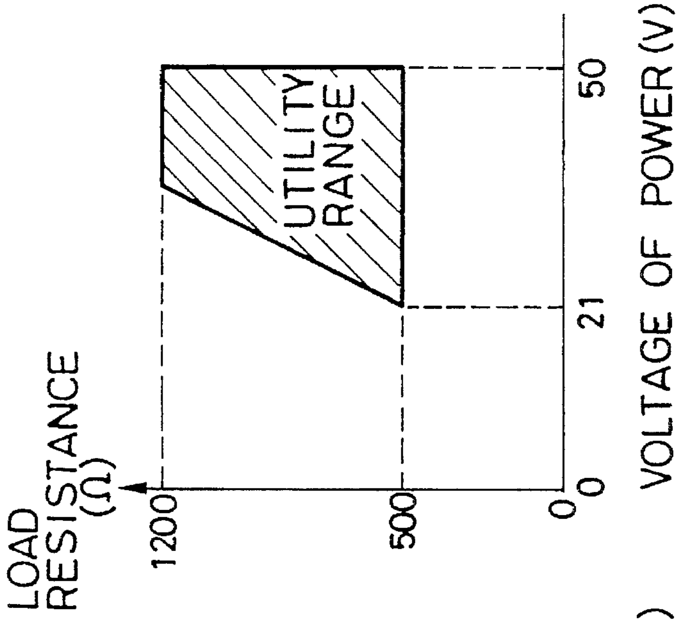
Figure 4:
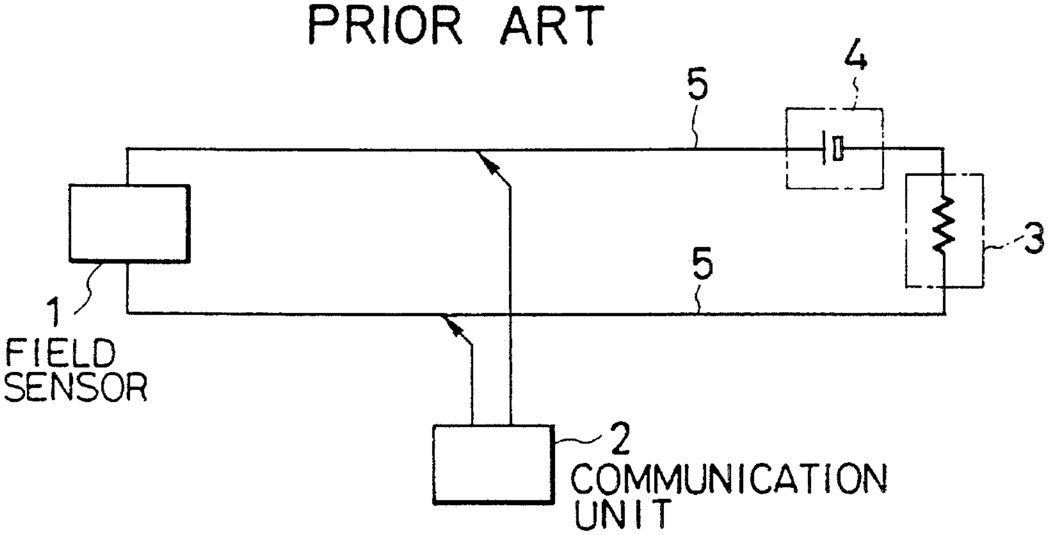
FIG. 4 PRIOR ART
FIG. 4 is a structural view which illustrates an example of a conventional field sensor communication system.

FIGS. 3A, 3B and 3C are respectively arranged in such a manner that the resistance Ω of the load resistor 30 should be read along the ordinate, while the voltage V of the external power source 4 should be read along the abscissa. FIGS. 3A and 3B and 3C thus arranged illustrate the usable range of the combination of the load resistance and the power supply voltage in the case where a 12 V or higher level is necessary to operate the field sensor 1, the usable range being designated by a cross-hatched section in each figure. FIGS. 3B and 3C illustrate the allowable range of the combination of the load resistance and the power supply voltage in the case where the levels of the transmission signal passing through the transmission line 5 are respectively made twice and 0.5 times the level in the case shown in FIG. 3A.

The resistor 30 connected in series in the transmission line 5 can be used at the voltage of the external power source 4 in accordance with the relationship shown in FIG. 3A. Therefore, when the voltage across the resistor 30 is detected by the amplifier 31, the analog current signal passing through the transmission line 5 can be detected. The thus obtained detection signal is transmitted to the upper system. The communicating device 32 is connected across the resistor 30, the communicating device 32 being constituted as shown in FIG. 5.

Figure 5:
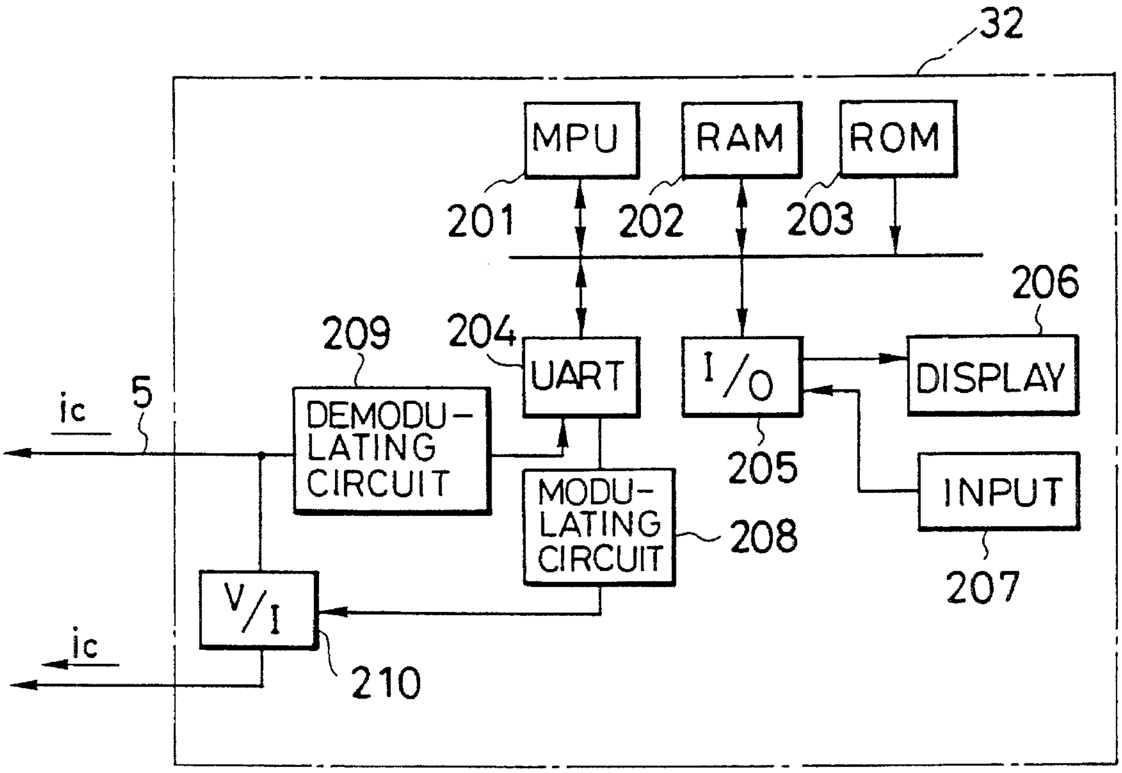
FIG. 5 is a structural view which illustrates an embodiment of a communication device of an upper receiving instrument in the field sensor communication system according to the present invention.

Referring to FIG. 5, the overall operation of the upper level receiving unit 3 is controlled by an MPU 201 in accordance with the program stored in a ROM 203. When a user operates an input device 207 constituted by a key board and the like by means of each of the keys having respective meanings, information thus inputted is transmitted to the MPU 201 via an I/O interface 205. The MPU 201 issues, if necessary, an instruction to perform a communication to a transmitting/receiving circuit 204, the communication being transmitted to a V/I converter 210 via a modulation circuit 208. The transmission signal transmitted from the transmitting/receiving circuit 204 to the modulation circuit 208 can be stored in a RAM 202 similarly to the case of the field sensor 1. The V/I converter 210 transmits a current corresponding to the input signal to the transmission line 5. If the output signal from the modulation circuit 208 is a square wave, sine wave or the like having the same amplitude in both the positive and the negative directions, the current transmitted from the communication device 32 becomes substantially the same level when totalled although an instantaneous change is involved.

The response signal, transmitted from the field sensor 1 which has received the above-described transmission signal, is demodulated as a digital signal when the change in the line voltage of the transmission line 5 is detected by a demodulation circuit 209. The thus demodulated signal is transmitted to the MPU 201 via the transmitting/receiving circuit 204. The MPU 201 displays the thus transmitted information, together with data stored in the RAM 202, on a display device 206 via the I/O interface 205.

The MPU 201, the RAM 202, the transmitting/receiving circuit 204, the I/O interface 205 and the modulation circuit 208 of the communication device 32 respectively transmit the transmission signal levels at a predetermined time interval after changing them in a plurality of steps and receive the signals, which have been transmitted therefrom, the signals being received via the demodulation circuit 209. The coincidence degree of the received signal and the transmitted signal is detected so that the signal is modulated to the most suitable transmission signal level so as to transmit it.

The demodulation circuit 209 stores a reference reception signal level and makes a comparison between the reception signal level detected as the change in the line voltage of the transmission line 5 and the above-described reference reception signal level. If the deviation exceeds a predetermined value, a comparison signal indicating whichever signal is larger than the other signal is transmitted to the MPU 201 via the transmitting/receiving circuit 204. The MPU 201, which has received the comparison signal, issues an instruction, via the I/O interface 205, to change the amplification degree or the attenuation degree in a direction in which the above-described deviation is reduced, the change being restricted within a range of the amplification degree or the attenuation degree set in the demodulation circuit 209. The demodulation circuit 209 changes the amplification degree or the attenuation degree in accordance with the instruction thus received so as to demodulate the reception signal. The thus demodulated reception signal is, as a digital signal, transmitted to the transmitting/receiving circuit 204. When the communication device 32 receives signals transmitted from other instruments or devices, the demodulating method described above will be applied. In this case, the transmission signal level from the modulation circuit 208 is maintained at a constant level. The means for changing the reception signal level by amplifying or attenuating and then demodulating it can be used similarly in the field sensor 1.

The upper level communicaiton device 2 is structured similarly to the communication device 32 shown in FIG. 5 so that a digital signal is transmitted by passing an electric current through the transmission line 5 and the digital signal is received by the change in the line voltage of the transmission line 5. Also the upper level communication device 2 is able to receive a signal which has been transmitted therefrom. Similarly to the field sensor 1 and the communication device 32, the upper level communication device 2 is arranged to be capable of switching the transmission signal level to the most suitable level selected from among the plurality of the transmission signal levels and changing the amplification degree or the attenuation degree of the reception signal so as to bring the level closer to the reference level.

If at least 12 V is necessary to operate the field sensor 1 in the above-described structure, the usable range for the external power source 4 for the field sensor 1 and the load resistor 30 becomes, for example, as shown in FIG. 3A. The reason for the above-described restriction lies in the fact that at least 6 to 10 V is necessary in principle for the line voltage of the transmission line 5 to operate the field sensor 1 and that the reception signal level is changed by value $R_L$ of the load resistance and the receivable level thereby is limited. As is shown from the above-described embodiment, the transmission signal level and the amplification/attenuation level of the reception signal can be switched to a plurality of levels. For example, when a transmission signal level (or reception signal level) expressed by current value mA is amplified twice, the usable range of the load resistor 30 is changed from the range designated by the cross-hatched section shown in FIG. 3A to the range similarly designated in FIG. 3B. FIG. 3C illustrates a usable range when the transmission signal level is halved (or the reception signal level is attenuated by half).

For example, when the load resistance is changed from 300 Ω to 200 Ω, the voltage across the load resistor generated by a current ic of the transmission signal, which is used for performing a communication and which has been superimposed on an analog signal denoting the physical quantities, that is, the level of the signal received as a change of the line voltage of the transmission line, is lowered. That is, the load resistance of 200 Ω in a state shown in FIG. 3A does not coincide with the cross-hatched section, that is, the combination of the load resistor and the power supply voltage does not coincide with the usable range. In this case, according to this embodiment, the MPU 101 or the MPU 201 makes, by cyclically changing the level of the transmission signal, a comparison in the coindence degree between the signal (the signal stored in the RAM) which has been transmitted therefrom and the signal (which has been transmitted therefrom) which has been received from the transmission line as the change in the line voltage. As a result, the MPU 101 or the MPU 201 selects the most suitable transmission level. When the value ic (the signal level) is, by a MPU via an I/O interface, selected to a level which is twice that in the case where the load resistance is 300 Ω, the usable range is changed from that shown in FIG. 3A to that shown in FIG. 3B. Therefore, it is apparent that the combination of the load resistance 200 Ω and the power supply voltage 25 V is included in the usable range.

As described above, according to the present invention, the transmission signal level or the amplification and/or attenuation level of the reception signal is switched to the most suitable level before each of the devices is operated. Therefore, an effect can be obtained in that the usable range of each of the devices can be widened.

Furthermore, the selection of the above-described most suitable level can be periodically performed by the device on the basis of the self-diagnosis of each of the devices or can be performed in response to an instruction issued from outside. Therefore, when the total load resistance is enlarged and the communication thereby becomes impossible due to the addition of, for example, an upper level receiving unit, each of the devices immediately and automatically selects the most suitable transmission signal level or the amplification and/or attenuation level of the reception signal and effective communication is thereby capable of being performed. As a result, an effect can be obtained in that the structure of the system can be easily changed.

According to the above-described embodiment, the coincidence degree of the transmitted signal and the received signal is used to determine whether or not the level of the transmission signal is a suitable level. A similar effect can be obtained by using the level of the received signal. In this case, similarly to the above-described embodiment, the transmission level of the transmission signals, transmitted from the modulation circuit in accordance with an instruction issued from the MPU whenever a predetermined time has passed, is successively changed in a short time. Furthermore, each of the communication signals of the different transmission levels is superimposed on the analog signal so as to be transmitted to the transmission line for a short time. However, according to this embodiment, the coincidence degree of the transmitted signal and the received signal is not detected, but a comparison is made between upper and lower reference levels which have been previously set in the demodulation circuit and the level of the signal received from the transmission line, the comparison being made by the demodulation circuit. A comparison signal indicating the fact that whichever signal is larger is transmitted whenever the above-described transmission level is changed with respect to the upper and the lower reference levels, the signal thus transmitted being stored by the RAM. When the continual transmission level changes have been completed, the MPU reads out data stored in the RAM so as to detect a transmission level, which corresponds to the reception signal included between the upper reference level and the lower reference level, as the most suitable level. Then, the MPU instructs the I/O interface to maintain the above-described most suitable transmission level. The I/O interface transmits an instruction to switch the transmission signal level to the modulation circuit in order to maintain the instructed transmission signal level until it receives a next instruction to change the transmission level after a predetermined time has passed. As a result, the modulation circuit transmits the transmission signal of the thus instructed most suitable level.

In the field sensor 1, the MPU 101, the RAM 102, the I/O interface 106, the modulation circuit 112 and the demodulation circuit 113 constitute means for determining whether or not the transmission signal, which has been superimposed on the analog signal, is received correctly. On the other hand, the MPU 101, the I/O interface 106 and the modulation circuit 112 constitute means for changing the transmission signal level which is, as described above, superimposed on the analog signal, in accordance with the out-put of above-described means for the determination. In the upper level receiving unit 3 and the upper level communication device 2, the MPU 201, the RAM 202, the I/O interface 205, the modulation circuit 208 and the demodulation circuit 209 constitute means for determining whether or not the transmission signal, superimposed on the analog signal, is received correctly. The MPU 201, the I/O interface 205 and the modulation circuit 208 constitute means for changing the level of the transmission signal superimposed on the analog signal in accordance with the output of above-described means for the determination.

Figure 2:
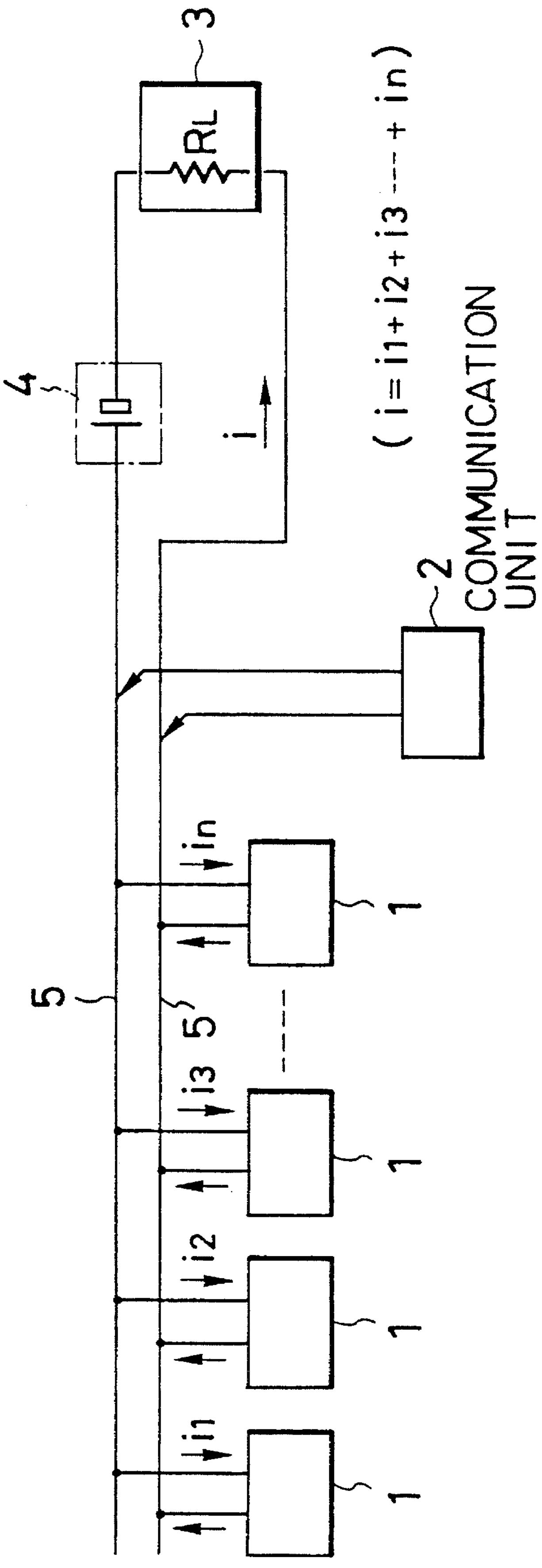
FIG. 2 is a structural view which illustrates another embodiment of the field sensor communication system according to the present invention.

FIG. 2 is a structural view which illustrates another embodiment of the present invention. Referring to the drawing, a structure arranged in such a manner that a plurality of field sensors 1 are provided and the outputs from the plurality of the field sensors are digital signals without exception.

The difference from the embodiment shown in FIG. 1 lies in that the instructed value transmitted by the analog signal in the range of 4 to 20 mA according to the above-described embodiment is transmitted by a digital signal according to this embodiment. Another difference lies in that a plurality of field sensors 1 are provided according to this embodiment. The other operations and the structures are the same as those according to the embodiment shown in FIG. 1. According to this embodiment, the transmission line 5 is arranged to be in the form of a bus so that the field sensor 1 can be positioned at an optional position on the transmission line 5. As usual, each of the field sensors 1 consumes a predetermined current ($i_1, i_2, i_3, \ldots i_n$) so that the current i passing through the load resistor $R_L$ of the upper receiving instrument 3 becomes the total value of the currents consumed by all of the field sensors 1. Therefore, if, for example, the number of the field sensors 1 is increased, the current passing through the load resistor $R_L$ is enlarged and the voltage across the load resistor $R_L$ is raised. In this state, since the voltage value of the external power source 4 is arranged to be constant, the line voltage of the transmission line is lowered contrarily. The above-described voltage must be about 6 to 10 V as described above. Therefore, if the voltage level is lower than the above-described level, the operation cannot be carried out properly. Therefore, the value of the load resistor $R_L$ must be reduced. When the value of the load resistor $R_L$ is reduced, the magnitude of the reception signal is reduced proportionally, causing the communication reliability to be deteriorated due to the S/N ratio. Therefore, the value of the load resistor $R_L$ must be arranged to be the largest value possible within the usable range shown in FIGS. 3A to 3C.

For example, when the system is being operated at a power supply voltage of 25 V, a load resistor of 300 Ω, an electric current i of 0.04 A, the voltage across the load resistor becomes 300×0.04=12 V. Furthermore, the power supply voltage added to the field sensor becomes 25–12=13 V. Therefore, the operation of the field sensor can be performed normally. When a second field sensor is added to the above-described system and the electric current i is increased to 0.07 A, the voltage across the load resistor is increased to 300×0.07=21 V. Furthermore, the power supply voltage to be added to each of the field sensors becomes 25–21=4 V. Therefore, the operation cannot be performed normally. Therefore, the load resistor is changed from 300 Ω to 150 Ω. As a result, the voltage across the load resistor becomes 150 ×0.07=10.5 V, and the power supply voltage to be added to the field sensor becomes 25–10.5=14.5 V. Therefore, the operation of the field sensor can be performed normally. On the other hand, the transmission signal transmitted to the transmission line via a modulation circuit and the V/I converter is detected as a voltage change through the transmission line. Provided that the signal level is constant, the voltage change, that is, the magnitude of the reception signal becomes one-half when the load resistor has been changed from 300 Ω to 150 Ω. According to the present invention, the lowering of the reception signal level or an error which takes place in the reception signal due to the above-described lowering is detected so as to raise the transmission signal level. According to this embodiment, each of the devices automatically selects the most suitable communication level. Therefore, an effect can be obtained in that the number of the field sensors can be increased with a highly reliable communication state being maintained.

As described above, of the field sensor communication system according to the present invention, the system can be expanded and reliable communication can be performed.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A field sensor communication system in which a signal is transmitted/received between at least a field sensor and at least an upper level unit, which is one of an upper level receiving unit and an upper level communication device, via a signal transmission line, at least one of said field sensor and said upper level unit of said field sensor communication system, comprising:

means for determining whether there is any communication error in a received digital transmission signal by comparing the transmitted signal with the received signal; and means for changing the amplitude level of said digital transmission signal in accordance with an output of said determining means.

2. A field sensor communication system in which an analog signal is transmitted/received between at least a field sensor and at least an upper level unit, which is one of an upper receiving device and an upper communication device, via a signal transmission line, at least one of said field sensor and said upper level unit of said field sensor communication system, comprising:

means for determining whether there is any communication error in a received digital transmission signal, which has been superimposed on said analog signal, by comparing the transmitted signal with the received signal; and means for changing the amplitude level of said digital transmission signal, which has been superimposed on said analog signal, in accordance with an output of said determining means.

3. A field sensor connected to a signal transmission line, comprising:

means for superimposing a digital transmission signal on a sensor signal to produce a superimposed signal;

means for transmitting said superimposed signal on said signal transmission line;

means for detecting said superimposed signal received from said signal transmission line so as to determine whether there is any communication error in said received signal, by comparing the transmitted signal with the received signal; and means for changing the amplitude level of said digital transmission signal to be superimposed on said sensor signal in accordance with an output of said detecting means.

4. A unit connected to a signal transmission line, comprising:

means for transmitting a digital transmission signal to said signal transmission line;

means for detecting said digital transmission signal received from said signal transmission line so as to determine whether there is any communication error in said received digital transmission signal by comparing the transmitted signal with the received signal; and means for changing the amplitude level of said digital transmission signal transmitted by said transmitting means in accordance with an output of said detecting means.

5. A communication device connected to a signal transmission line, comprising:

means for transmitting a digital transmission signal to said signal transmission line;

means for detecting said digital transmission signal received from said signal transmission line so as to determine whether there is any communication error in the received digital transmission signal by comparing the transmitted signal with the received signal; and means for changing the amplitude level of said digital transmission signal transmitted by said transmitting means in accordance with an output of said detecting means.

6. A field sensor communication system in which a signal is transmitted/received between at least a field sensor and at least one of a receiving unit and a communication device via a signal transmission line, and in which said communication device is connected to said signal transmission line at a position between said field sensor and said receiving unit, said field sensor comprising:

means for superimposing a digital transmission signal on a sensor signal to produce a superimposed signal;

means for transmitting said superimposed signal on said transmission line;

means for detecting said superimposed signal received from said signal transmission line so as to determine whether there is any communication error in said received signal by comparing the transmitted signal with the received signal; and means for changing the amplitude level of the digital transmission signal transmitted by said transmitting means in accordance with an output of said detecting means;

said at least one of said receiving unit and said communication device comprising:

means for transmitting a digital transmission signal to said signal transmission line;

means for detecting said digital transmission signal received from said signal transmission line so as to determine whether there is any communication error in the received digital transmission signal; and means for changing the amplitude level of said digital transmission signal transmitted by said transmitting means in accordance with an output of said detecting means.

7. A field sensor communication system in which an analog signal is transmitted/received between a field sensor and a unit, which is one of a receiving device and communication device, via a signal transmission line, at least one of said field sensor or said unit of said field sensor communication system comprising:

means for superimposing a digital transmission signal of predetermined amplitude level on said analog signal to produce a superimposed signal;

means for determining whether there is any communication error in a superimposed signal received from said signal transmission line by comparing the transmitted signal with the received signal; and means for changing the amplitude level of said superimposed digital transmission signal received from said signal transmission line in accordance with an output of said determining means.

8. A communication device connected to a signal transmission line, comprising:

means for receiving a digital transmission signal via said signal transmission line;

means for determining whether there is any communication error in the received digital transmission signal by comparing the transmitted signal with the received signal; and means for changing the amplitude level of said received digital transmission signal in accordance with said determining means.

9. A field sensor communication system in which an analog signal is transmitted/received between a field sensor and at least one of a receiving unit and a communication device via a signal transmission line, said field sensor comprising:

means for superimposing a digital transmission signal on said analog signal to produce a superimposed signal;

means for receiving said digital transmission signal, which has been superimposed on said analog signal, from said signal transmission line; and means for making a comparison between the amplitude level of said received digital transmission signal and a predetermined amplitude level and for changing the amplitude level of said digital transmission signal to a level with which said digital transmission signal can be received without communication error based on the comparison between the amplitude level of said received digital transmission signal and said predetermined amplitude level.

10. A field sensor communication system in which a digital signal is transmitted/received between a field sensor and a unit, which is one of a receiving device and a communication device via a signal transmission line, at least one of said field sensor and said unit of said field sensor communication system comprising:

means for determining whether there is any communication error in a digital signal received via said signal transmission line by comparing the transmitted signal with the received signal; and means for changing the amplitude level of a digital signal being transmitted in accordance with an output of said determining means.

11. A field sensor communication system in which a signal is transmitted/received between at least a field sensor and at least an upper level unit, which is one of an upper level receiving unit and an upper level communication device, via a signal transmission line, at least one of said field sensor and said upper level unit of said field sensor communication system, comprising:

first means for detecting the coincidence degree between the transmission signal and the received signal and determining the best amplitude level of the transmission signal; and means for changing the amplitude level of said digital transmission signal in accordance with an output of said first means.

* * * * *